United States Patent Office 3,516,588
Patented June 23, 1970

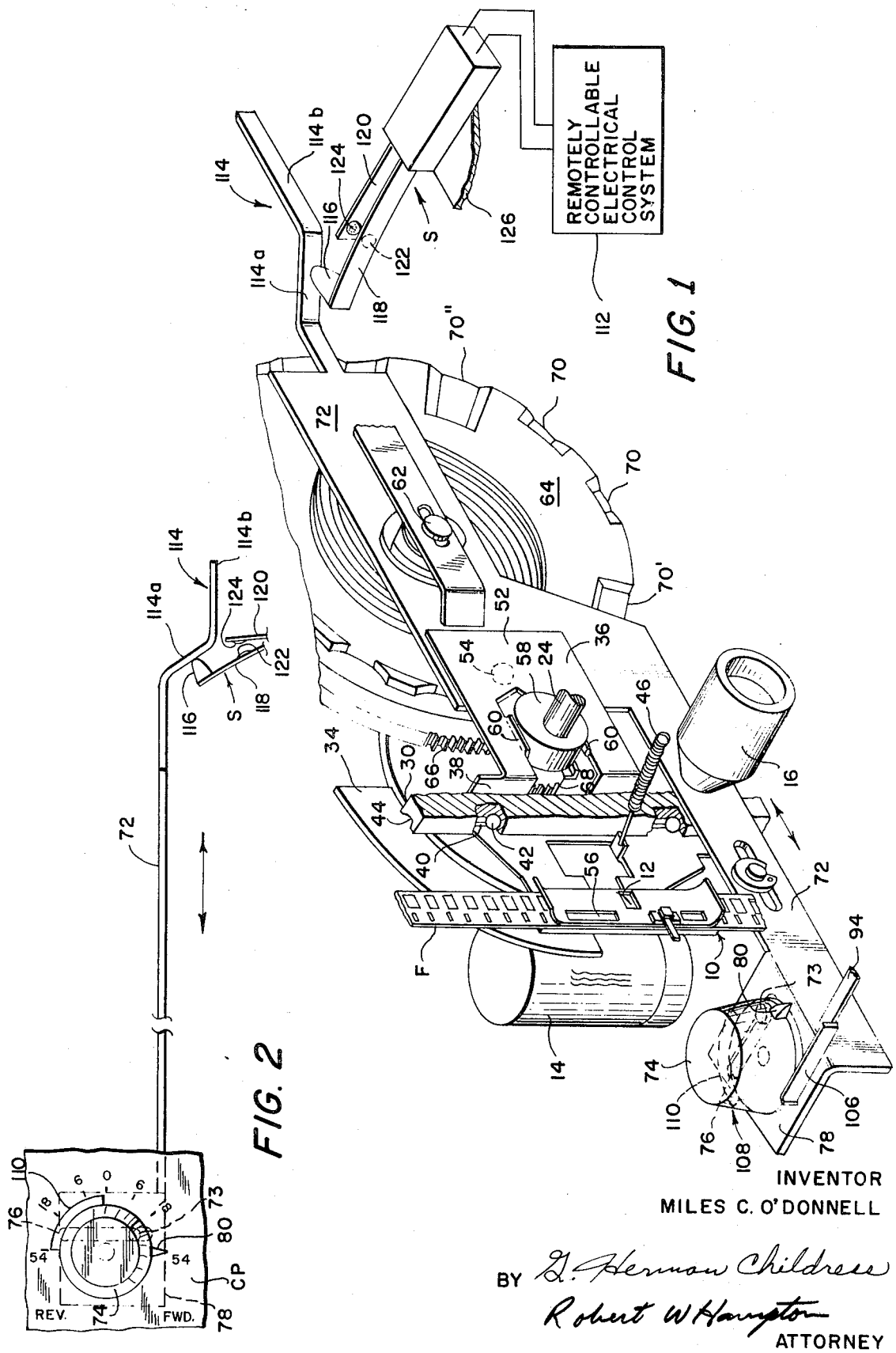

3,516,588
PROJECTOR SYSTEM WITH AUTOMATIC CUT-OUT SWITCH FOR CONTROL UNITS DURING HIGH SPEED OPERATION
Miles C. O'Donnell, Rochester, N.Y., assignor to Eastman Kodak Company, Rochester, N.Y., a corporation of New Jersey
Filed Jan. 5, 1968, Ser. No. 695,954
Int. Cl. G03b 1/22
U.S. Cl. 226—43                                                    14 Claims

ABSTRACT OF THE DISCLOSURE

A cut-out switch in a motion picture projector automatically disables an electrical control unit upon changeover to high speed operation of the projector in either forward or reverse direction. A switch actuating member is mounted on a speed control lever, axial movement of which is controlled by a speed control knob. Setting of the knob to either of the extreme positions thereof, corresponding to 54 frames per second operation of the projector in forward and reverse directions, causes movement of the switch actuating member to a position where the switch is opened and the electrical control unit disabled.

CROSS-REFERENCES TO RELATED APPLICATIONS

Reference is made to commonly assigned copending U.S. patent application Ser. No. 659,718, entitled Motion Picture Projector System, filed Aug. 10, 1967, in the name of Richard Clarence Painton.

FIELD OF THE INVENTION

This invention relates to switching mechanisms and more particularly to cut-out switches for film projectors, particularly motion picture projectors, for automatically disabling all or a portion of the control circuits therefor under predetermined conditions.

BACKGROUND OF THE INVENTION

In commonly assigned copending U.S. patent application Ser. No. 659,718, the entire disclosure of which is incorporated herein by reference, there is disclosed a motion picture projector system which includes a remote control unit for controlling the operation of the projector through an electrical control circuit. The control circuit includes means for stopping the film advance either at will or in response to code marks on the film, and starting the film advance through the projector as well as for changing the direction of film advancement. The system also includes a cut-out switch for disconnecting the entire electrical control circuit under certain predetermined circumstances. For example, the projector is operable at different speeds, and where the response times of the circuit components used in the control circuit are inadequate for certain elevated film speeds, e.g., for the specialty speed of 54 frames per second, the entire electrical control circuit may be disconnected by opening the cut-out switch.

SUMMARY OF THE INVENTION

The present invention provides a switching arrangement particularly adapted to provide cut-out switching for the system of the copending application. In accordance with the present invention a cut-out switch for a projector function is opened automatically in response to the setting of a projector control mechanism to predetermined positions. In a specific embodiment setting of a speed control knob to a position corresponding to 54 frame per second operation of the projector in either a forward or reverse direction causes opening of a cut-out switch.

In accordance with a presently preferred embodiment of the invention a switch actuating member is located on a shift lever which controls the speed setting of the projector. An eccentric pin located on a film speed control knob extends into an elongate slot in a turned-over end portion of the shift lever. Rotation of the knob causes axial movement of the shift lever and corresponding axial movement of the switch actuating member. The actuating member causes opening of the switch at the two extreme end positions of the knob, these positions corresponding to operation of the projector in 54 frames per second forward and 54 frames per second reverse modes.

BRIEF DESCRIPTION OF THE DRAWINGS

Other features and advantages of the present invention will become apparent upon consideration of the following description and drawings wherein:

FIG. 1 is a perspective view of an exemplary embodiment of a projector switching arrangement in accordance with the invention, only so much of the associated projector system being shown as is sufficient for an understanding of the present invention.

FIG. 2 is a schematic top view of the switching arrangement of FIG. 1 with only so much of the projector system shown as is necessary to enable an understanding to be made of the invention.

DESCRIPTION OF THE PREFERRED EMBODIMENT

Referring to FIG. 1 of the drawings, there are shown parts of a projector system sufficient for an understanding of the present invention. The projector generally comprises a film gate 10 indicated generally or defining an aperture 12 which is illuminated by a lamp 14 located behind the gate 10 as shown. A motion picture film F is adapted to be intermittently moved through the gate 10 by a pull-down claw mechanism described hereinafter. As each frame of the film is moved into alignment with the aperture 12 in the gate 10, it is illuminated by the lamp 14 and projected by a lens system denoted 16.

A drive shaft 24 is driven by a motor (not shown) through a pulley system (not shown) such that a rotating sector shutter 34 will intercept the light beam from source 14 a a predetermined number of cycles per second (54 cycles in an exemplary embodiment), and only at the time in which the film F is being moved through the gate 10.

The pull-down mechanism includes a rigid claw arm 36 extending laterally of the film F and having an offset portion 38 intermediate its two ends. The claw arm 36 is mounted to move up and down and pivot relative to the film gate 10 by having a pair of vertically spaced ball seats 40 formed in the forward face thereof seating a pair of spaced ball bearings 42 which are in turn rotatably positioned in a vertical ball race 44 formed in one edge of the forward wall 30 of the projector. The claw arm 36 is held in assembled relation on the ball bearings 42 by a spring 46 one end of which is attached to the claw arm on the side of the pivot point nearest the gate and the other end of which is attached to a pin (not shown) fixed to the projector. The spring 46, in addition to holding the claw arm in assembled relation with its ball mountings, also acts to bias one or more film engaging claws or teeth (not shown) on one end of the arm toward the gate 10 into a film engaging position. In addition the spring 46 also acts to force the other end of the claw arm 36 against a ball 54 (shown in dashed lines in FIG. 1) which acts as a follower engaging the in-anout cam means as will be more fully described hereinafter. As is well known, the claw arm will reciprocate up and down on the ball bearings to effect the film advance and will pivot about these ball bearings to move the claw teeth into and out of engagement with the film, the gate being provided with elongated slots 56 to accommodate the teeth and allow the up and down movement of the claw 36 while the teeth are in engagement with the film F.

In the arrangement shown, the up and down movement of the claw arm 36 edgewise for feeding the film is under the control of an up and down or pull-down cam 58 fixed to the drive shaft 24 and embraced by a pair of followers 60 fixed to the claw arm 36 and extending substantially at right angles to the vertical ball race 44. Since each revolution of the up-and-down cam 58 produces one complete reciprocal stroke of the claw arm 36, and since the drive shaft is rotating at 54 r.p.s., the claw arm 36 will be reciprocated at a rate of 54 strokes per second.

The in-and-out movement of the pull-down claw relative to the film gate is produced by skip-stroke mechanism which will not be described. A wheel or face cam 64 is fixed to a shaft 62 rotatably mounted in a wall of the projector (not shown) and in substantially parallel relation with drive shaft 24. One surface of cam 64 is fixed to or carries a gear 66. Gear 66 is driven by a pinion 68 which is rotatably and slidably mounted on the drive shaft 24 and is selectively coupled thereto by a clutch means (not shown). The shutter 34 described above is fixed to the pinion 68 to rotate therewith.

The other, or forwardly directed, surface of the face cam 64 is provided with a plurality of depressions 70, 70', and 70'' which are spaced circumferentially about the surface of face cam 64 and have their leading and trailing edges tapered into the surface of the cam so that a follower pressed against the face of the cam can move into and out of the depressions as the cam rotates. These depressions, htherefore, constitute cam surfaces which in combination with the surface of the face cam 64 form a series of concentric in-and-out cams whose profiles control the in-and-out movement of the claw 36. Depressions 70' are approximately twice as long, measured in a radial direction, as depressions 70, while depression 70'' is approximately three times as long as depressions 70 measured in the same sense. Accordingly, starting at the outside of the face cam, and moving radially inwardly thereof, there is a series of concentrically arranged in-and-out cams comprising an outer group of nine depressions separated by nine high areas of substantially the same arcuate length as the depressions, then a group of three depressions separated by three high areas each having an arcuate length substantially three times that of the depressions, then a group consisting of one depression, and finally a concentric circle in which there are no depressions. This arrangement of cam surfaces provides a multiple in-and-out cam by means of which the skip-rate of the in-and-out movement of the claw can be changed relative to the pull-down stroke to vary the rate by which the film F is advanced through the gate 10 by merely moving the ball follower 54 radially of the face cam and into alignment with different ones of said concentric and circular cam surfaces. In-and-out movement is transmitted to the claw arm 36 from the in-and-out cams by the ball follower 54 which is pressed against the face of the in-and-out cam 64 by the follower end 52 of the claw arm which is loaded in this direction by the action of spring 46 biasing the claw arm 36 into engagement with the film F. It will thus be seen that spring 46 in addition to forcing the ball follower 54 into engagement with the in-and-out cam also serves to hold the ball follower 54 in assembled relation. The depressed cam surfaces 70, 70', and 70'' are of such depth that when the ball follower drops into one of the same the spring 46 can pivot the claw arm 36 far enough to engage the claw teeth with the film perforations. On the other hand, when the ball follower 54 rides out of a depression and onto the surface of the face cam 64 between depressions the claw arm will be pivoted against the action of spring 46 by a sufficient amount to withdraw the claw teeth from the film path. Accordingly, each circular series of depressed cam surfaces in combination with the face surface of the cam therebetween will constitute a circular in-and-out cam for controlling the movement of the claw teeth to and from the film path of the gate 10. While the innermost circle of the in-and-out cam described has no depressed cam surfaces, the face surface of the cam causes the claw to be held out of engagement with the film for the projection of "stills" and thus may be said to constitute an in-and-out cam despite the fact it possesses no depressed cam surfaces.

The reduction ratio between pinion 68 and gear 66 on the face cam 64 is nine to one (9:1). Since there are nine depressed cam surfaces on the outer circular group of the face cam, when the ball follower is positioned radially of the face cam to engage this group it will produce an in-and-out stroke of the claw for each revolution of the up and down cam 58. This means that the film F will be pulled down one frame per revolution of the cam 58 or at a rate of 54 frames per second. When the ball follower 54 is moved radially inwardly on the face cam to engage the next circular group of depressed cam surfaces, or that circle containing three depressed cam surfaces 70' and 70'', the claw arm 36 will be moved in and out once for every three revolutions of the up and down cam 58 and the film will be advanced at a rate of 18 frames per second. When the follower ball 54 is moved inwardly to the circle containing one cam surface 70'' it produces one in-and-out stroke of the claw arm 36 for every nine revolutions of the up-and-down cam 58 and advances the film at a rate of six frames per second.

If the ball follower 54 is moved in on the face cam 64 to a position where there are no depressed cam surfaces there will be no in-and-out movement of the claw and the claw teeth will be held out of engagement with the film by the face surface of the cam. This position of the ball follower will produce a condition of still projection in which the shutter continues to run at 54 frames per second.

The ball follower 54 is captured in an aperture (not shown) in the end of a shift lever 72 which may be adjusted back and forth as indicated by the double ended arrow in FIGS. 1 and 2 to vary the rate of film advance by positioning the ball follower radially of the face cam to selectively engage the different groups of cam surfaces.

The shift lever 72 may be pushed back and forth in the direction of the double arrow shown in FIG. 1 by means of an eccentric pin 73 on a control knob 74 which engages an elongated slot 76 in a turned-over end portion 78 of the shift lever 72. The control knob 74 is rotatably mounted on a control panel, denoted CP (not shown in FIG. 1), of the projector and a pointer 80 on knob 74 co-operates with a speed scale calibrated in rates of 54, 18, 6 and 0, frames per second forward (0 corresponding to still), and in corresponding frames per second in reverse. The control knob 74 is capable of a movement slightly greater than 180°, and in going from one limit of this movement to the other shifts the ball follower 54 from the position where it engages the outermost group of cam surfaces on the face cam (54 frames per second) to its innermost position on the face cam (still projection) and then out again on the cam surface to the 54 frame per second position. The axial movement of shift lever 72 also controls the opening and closing of a cut-out switch in a manner described hereinafter.

When the shift lever 72 is moved in the direction of the double arrow shown in FIG. 1, the radial position of the ball follower 54 on the in and out cam 64 is determined by the radial position of four concentric detent grooves (not shown) in the surface of face cam 64 into which a detent ball (not shown) is forced to fall. Reference is made to the above-mentioned co-pending application for a more complete description of this phrase of operation of the face cam 64.

In order to achieve reverse projection in addition to variable rate pull-down without having to stop or reverse the direction of the drive motor (not shown) or of the drive shaft 24, means are provided for reorienting the up and down cam 58 from its original position relative to the in-and-out cam 64. When this is done, the in-and-out cam 64 which normally forces the claws into the film path just prior to the start of the down stroke, will instead force the claws into the film path just prior to the beginning of the up stroke and withdraw them from the film path at the completion of the up stroke of the claw arm 36. In brief the reversing means comprises a pivoted shift lever 94 (a portion of which is shown in FIG. 1) which is actuated by a cam generally denoted 108 located on knob 74.

An end or follower portion 106 of shift lever 94 is biased against the periphery of cam 108 and is caused to be pivoted by an arcuate lobe portion 110 of cam 108. The lobe 110 is so positioned on control knob 74 relative to the eccentric pin 73 thereon that it will not engage follower 106 to reverse the projector except when the control knob is in a position to have shifted the follower 54 on the in-and-out cam 64 to a position where the claw 36 is held out of engagement with the film and thus the advancement of the film is stopped.

Shift lever 94 when actuated engages a drive pulley (not shown) which shifts the drive shaft 24 axially to the left. With shaft 24 so shifted, pinion 68 slips back precisely 180° so that a reverse driving dog (not shown) located thereon engages pull-down arm 58 and continues to operate in this position to effect reverse projection. Reference is again made to co-pending application 659,718 for a more complete description of this portion of the reversing mechanism.

From the foregoing, it can be seen that control knob 74 controls both the rate of advancement of the film, through control of the position of ball follower 54, and the direction of advancement of the film, through control of shift lever 94.

The projector system of co-pending U.S. application Ser. No. 659,718 includes a remotely controlled electrical circuit for controlling forward and reverse operation at different speeds and operation in a still projection mode as well as for effecting automatic motion-still operation in response to light-transmitting or light-opaque code marks on different kinds of film. The description of that system in the above-mentioned application is hereby incorporated by reference. For purposes of describing the present invention the electrical control circuit is represented by block 112. As set forth hereinbefore the control circuit 112 includes certain components such as solenoids whose response times are inadequate for controlled variable operation of the projector during the high speed 54 frame per second mode. For this reason, the system of the co-pending application includes a cut-out switch which when opened disconnects the entire control circuit.

The switch arrangement generally denoted S in FIGS. 1 and 2 is particularly suited for use as a cut-out switch of the type described. The switching arrangement includes a strip-like actuating member 114 mounted on shift lever 72. Actuating member 114 is formed as an elbow which includes a portion 114a extending outwardly of and a portion 114b extending substantially parallel to lever 72. Portion 114a extends outwardly to a position adjacent a tip member 116 mounted on a flat, flexible switch arm 118 of switch S. Switch arm 118 carries a contact 122 which lies opposite contact 124 on opposing switch arm 120. Switch S is fixedly mounted on a portion of the projector housing denoted 126. In the position shown in FIGS. 1 and 2 actuating elbow 114 contacts tip member 116 on flexible arm 118 and forces arm member 118 to bend away from opposing arm 120 so that contacts 122, 124 are opened.

As actuating elbow 114 moves past tip member 116 (to the right as viewed in FIG. 1) and contact therebetween is broken, flexible arm 118 returns to the normal position thereof wherein contact 122 mates with contact 124 and the switch S is closed.

Considering the overall operation of the device, rotation of knob 74 controls both the speed and direction of film advancement in a manner described hereinbefore. Rotation of knob 74, through the camming action of eccentric pin 73 in elongate slot 76, causes axial movement of shift lever 72 and thus of actuating elbow 114. Elbow 114 is positioned with respect to shift lever 72 such that with the shift lever 72 in the least extended position thereof (i.e., the position furthest to the left as viewed in FIG. 1) elbow 114 will firmly engage with tip member 116 and cause opening of the switch as described above. This position corresponds to the setting of knob 74 for 54 frame per second operation in either the reverse of forward direction. As knob 74 is rotated from a first end position, for example, from the 54 frame per second forward position shown in FIGS. 1 and 2, the eccentric pin 73 acting on slot 76 will drive shift lever 72 to the right as shown in FIG. 1 so that actuating elbow 114 moves away from engagement with tip member 116 and switch contacts 122, 124 close. Elbow 114 will continue to move away from tip member 116 until the indicator 80 on knob 74 passes through the position on the speed scale corresponding to still projection whereupon elbow 114 will begin movement back toward tip member 116. Switch contacts 122, 124 will remain closed until knob 74 reaches the other end position thereof corresponding to 54 frame per second reverse operation. In this latter position elbow 114 again engages tip member 116 and contacts 122, 124 are opened.

From the foregoing, it can be seen that cut out switch S is closed for all settings of knob 74 except those corresponding to 54 frame per second forward and reverse operation and that when knob 74 is moved to either of these settings switch S will automatically open to disable the electrical control circuit 112.

It will be appreciated from the foregoing that the switching arrangement of the invention provides a simple, inexpensive and effective means for disconnecting the electrical control circuit 112 automatically upon setting of control knob 74 to a predetermined position.

The invention has been described in detail with particular reference to preferred embodiments thereof, but it will be understood that variations and modications can be effected within the spirit and scope of the invention as described hereinabove and as defined in the appended claims.

What is claimed is:

1. A projector apparatus comprising a film gate having a projection aperture, means for feeding film through said gate to successiviely position the image frames in alignment with said aperture to effect projection of the film, means including a movable control member for variably controlling the rate of feed of film through said gate, electrical circuit means for changing the mode of operation of said projector from motion to still projection, and switching means for automatically disabling at least a portion of said electrical circuit means in response to movement of said movable member to a position corresponding to a predetermined rate of feed of the film.

2. A projector apparatus as claimed in claim 1 wherein said electrical circuit means selectively controls the mode and direction of film feed, and said switch means disables at least those portions of the circuit which control mode and direction.

3. A projector system as claimed in claim 1 wherein a portion of said switching means is mounted on said movable control member.

4. A projector system as claimed in claim 3 wherein said switching means comprises an actuating member mounted on said movable control member and movable therewith and a switch comprising a pair of switch contacts and engaging means positioned in the path of movement of said actuating member for engaging said actuating member to cause opening of said switch contacts upon movement of said control member to a location corresponding to a predetermined speed of feed of said film through said gate.

5. A projector system as claimed in claim 4 wherein said actuating member comprises an elbow member extending outwardly of said control member, and said engaging means comprises an elongate flexible switch arm, one of said switch contacts being mounted on said flexible switch arm.

6. A projector system as claimed in claim 4 further comprising direction control means for automatically controlling the direction of advancement of the film through said gate, said rate control means and said direction control means providing a plurality of speeds of advancement of the film in the forward and reverse directions, and rotatable means for controlling both said rate control means and said direction control means, said rotatable means being rotatable between a first end position corresponding to the highest film speed provided by said rate control means in the forward direction and a second end position corresponding to the highest film speed provided by said rate control means in the reverse direction, said rotatable means, in said first and second end positions, causing movement of said switch actuating member into engagement with said engaging means to cause opening of said switch.

7. A projector system as claimed in claim 6 wherein said movable rate control member comprises an axially movable lever including a turned-over end portion having an elongated slot therein and said rotatable means comprises a rotatable knob member including an eccentrically mounted outwardly extending pin member which extends into said elongate slot.

8. A projector system as claimed in claim 1 further comprising direction control means for automatically controlling the direction of advancement of the film through said gate, said rate control means and said direction control means providing a plurality of speeds of advancement of the film in the forward and reverse directions, and rotatable means for controlling both said rate control means and said direction control means, said rotatable means being rotatable between a first end position corresponding to the highest film speed provided by said rate control means in the forward direction and a second end position corresponding to the highest film speed provided by said rate control means in the reverse direction, said rotatable means, in said first and second end positions, causing actuation of said switching means to disable said predetermined control capability.

9. In a projector apparatus comprising a film gate having a projection aperture, means for selectively feeding film through said gate in a variable manner, a movable control member for selecting a desired manner of feeding, and electrical control circuit means for selectively varying the mode of operation of said projector and capable of overriding the controlling effect of said movable control member in at least certain settings of said movable control member, the improvement comprising switch means for automatically disabling at least a portion of said electrical circuit means in response to movement of said movable control member to a predetermined position corresponding to a predetermined manner of feeding film through said gate.

10. Projector apparatus as claimed in claim 9 wherein said first mentioned means comprises means for selectively feeding film through said gate at any of a plurality of rates to effect projection at variable rates, and said movable control member comprises a rate selector.

11. Projector apparatus as claimed in claim 10 wherein said movable control member also comprises means for selecting the direction of film feed, and wherein said film feeding means feeds film reversibly through said gate.

12. Projector apparatus as claimed in claim 9 wherein said electrical circuit means includes means for stopping and starting film feed during operation of said projector.

13. Projector apparatus as claimed in claim 9 wherein said electrical circuit means includes means for reversing the direction of film feed through said gate.

14. Projector apparatus as claimed in claim 9 wherein said electrical circuit means includes means responsive to code marks on the film for varying the mode of operation of the projector.

References Cited

UNITED STATES PATENTS 3,140,027   7/1964   Roman _____ 226—178 X

ALLEN N. KNOWLES, Primary Examiner

U.S. Cl. X.R.

226—51, 178